United States Patent [19]
Chen

[11] Patent Number: 5,669,499
[45] Date of Patent: Sep. 23, 1997

[54] CASSETTE FOR SUPPORTING AN AUDIO TAPE IN A COMPACT DISC RACK

[76] Inventor: Tsong-Hsien Chen, P.O. Box 63-99, Taichung, Taiwan

[21] Appl. No.: 613,899

[22] Filed: Mar. 11, 1996

[51] Int. Cl.⁶ ............................... B65D 79/00
[52] U.S. Cl. .................. 206/387.1; 206/387.12
[58] Field of Search .................. 206/309, 307, 206/308.1, 387.1, 311, 312, 387.12, 387.14

[56] References Cited

U.S. PATENT DOCUMENTS

| | | | |
|---|---|---|---|
| Re. 32,753 | 9/1988 | Ackeret | 206/387.12 |
| 4,289,235 | 9/1981 | Egly | 206/387.13 |
| 4,428,480 | 1/1984 | Ackeret | 206/387.12 |
| 4,702,369 | 10/1987 | Philosophe | 206/310 |
| 4,962,854 | 10/1990 | Ricci | 206/387.1 |
| 5,101,971 | 4/1992 | Grobecker | 206/308.1 |
| 5,244,085 | 9/1993 | Lammerant et al. | 206/308.1 |
| 5,259,498 | 11/1993 | Weisburn et al. | 206/312 |
| 5,282,243 | 1/1994 | Gelardi et al. | 206/310 |
| 5,515,968 | 5/1996 | Taniyama | 206/308.1 |
| 5,542,531 | 8/1996 | Yeung | 206/308.1 |

FOREIGN PATENT DOCUMENTS 406227584  8/1994  Japan .................. 206/387.1

*Primary Examiner*—Paul T. Sewell
*Assistant Examiner*—Nhan T. Lam

[57] ABSTRACT

A cassette includes a base having two notches and depressions formed in the side walls. An insert is received in the base and has one or more recesses aligned with the depressions of the base. The insert may receive an audio tape and has two notches aligned with the notches of the base. A cap is pivotally coupled to the base and has one or more protrusions for engaging with the recesses and the depressions so as to retain the cap in place. The cassette has a size that may be stored in a typical CD storing rack.

1 Claim, 3 Drawing Sheets

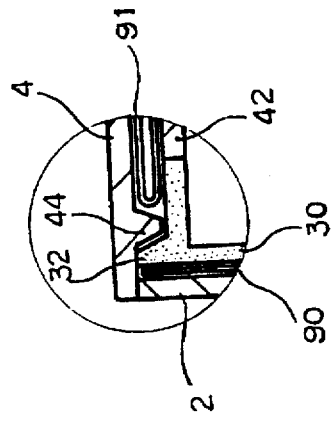
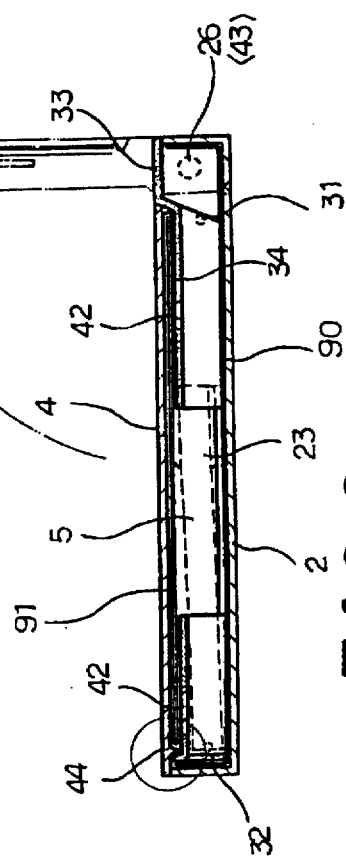
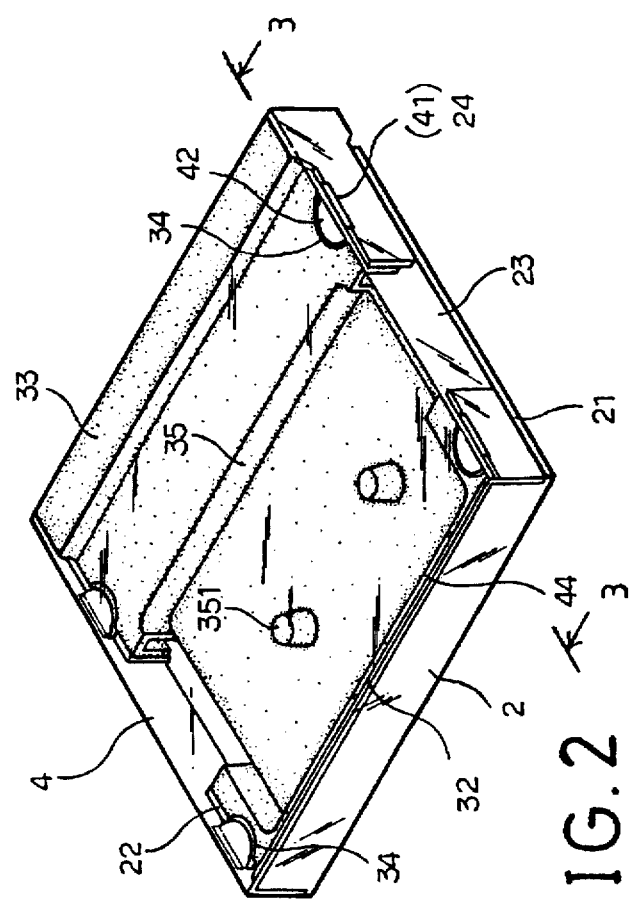
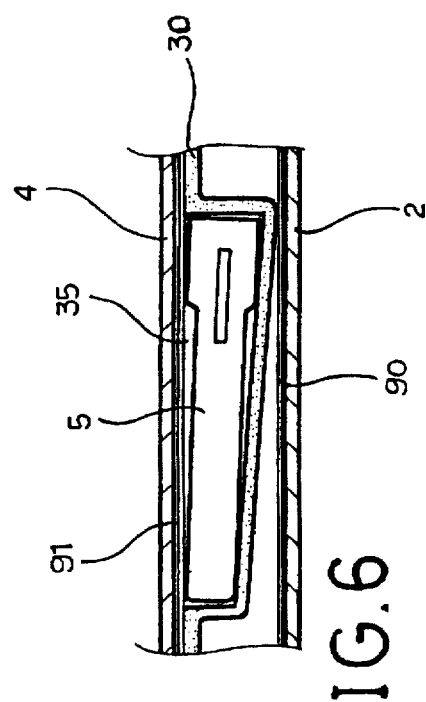

CASSETTE FOR SUPPORTING AN AUDIO TAPE IN A COMPACT DISC RACK

BACKGROUND OF THE INVENTION

1. Field of the Invention

The present invention relates to a cassette, and more particularly to a cassette which may store an audio tape in a compact disc (abbreviated as CD hereinafter) storing rack.

2. Description of the Prior Art

Typical audio cassettes comprise a size smaller than that of the CD casing such that the radio cassette may not be engaged and stored in the typical CD rack.

The present invention has arisen to mitigate and/or obviate the afore-described disadvantages of the conventional audio cassettes.

SUMMARY OF THE INVENTION

The primary objective of the present invention is to provide a cassette which includes an increased size that may store an audio tape in a typical CD storing rack.

In accordance with one aspect of the invention, there is provided a cassette for supporting an audio tape in a compact disc rack, said cassette comprising a base including two sides each having a flange laterally extended outward therefrom and each having a side wall extended upward therefrom, the side walls each including a middle portion having a first notch formed therein and each including an upper portion having at least one depression formed therein, the side walls each including at least one hole formed therein and each including a rear portion having an aperture formed therein, the base including a room formed therein, an insert engaged in the room of the base and including two side portions each having at least one projection formed therein for engaging with the holes of the base so as to be secured to the base, the insert including a front wall and including a rear panel and including at least one recess formed in the side portion for aligning with the depressions of the base, the insert including a cavity formed therein for receiving an audio tape therein, the side portions of the insert each including at least one second notch formed therein for aligning with the first notches of the base and for allowing the audio tape to be removed from the insert, and a cap including a rear portion having two bulges formed thereon for engaging with the apertures so as to allow the cap to be rotated relative to the base about the bulges, the cap including two side portions each having at least one protrusion extended inward therefrom for engaging with the recesses and the depressions so as to retain the cap in place, the cap including a front portion having at least one rib formed therein for engaging with the front wall of the insert so as to retain the cap to the insert. It is preferable that the insert includes a tapered bottom for supporting the audio tape in a position such that the upper surface of the audio tape is horizontal.

Further objectives and advantages of the present invention will become apparent from a careful reading of a detailed description provided hereinbelow, with appropriate reference to accompanying drawings.

BRIEF DESCRIPTION OF THE DRAWINGS

FIG. 2 is a perspective view of the cassette;

FIG. 3 is a cross sectional view taken along lines 3—3 of FIG. 2;

FIG. 4 is an enlarged partial cross sectional view of the radio cassette;

FIG. 6 is a partial cross sectional view illustrating the other application of the insert.

DETAILED DESCRIPTION OF THE PREFERRED EMBODIMENT

Figure 1:
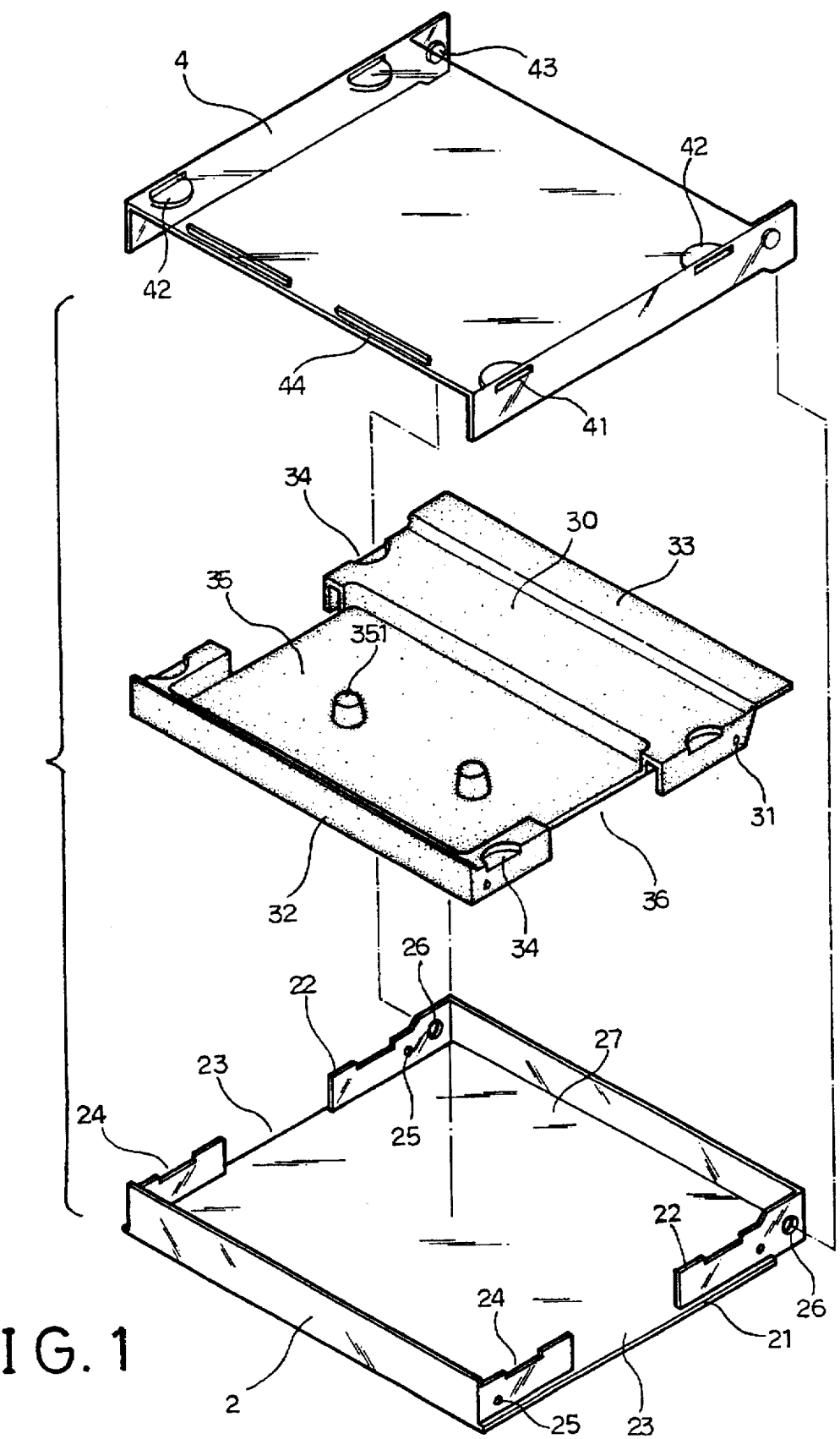
FIG. 1 is an exploded view of a cassette for supporting an audio tape in a CD rack in accordance with the present invention.

Referring to the drawings, and initially to FIGS. 1 to 4, a cassette for supporting an audio tape in a CD rack in accordance with the present invention comprises a base 2 including two sides each having a flange 21 laterally extended outward therefrom and each having a wall 22 extended upward therefrom. The walls 22 each includes a notch 23 formed in the middle portion and each includes one or more depressions 24 formed in the upper portion. The walls 22 each includes one or more holes 25 formed therein and each includes an aperture 26 formed in the rear portion thereof. The base 2 includes a room 27 formed therein for engaging with an insert 30.

The insert 30 includes one or more projections 31 formed in the side portions thereof for engaging with the holes 25 of the base 2 so as to be secured to the base 2. The insert 30 includes a front wall 32 having a height as high as that of the base and includes a rear panel 33 flush with the upper portion of the base 2, best shown in FIGS. 2 and 3. The insert 30 includes one or more recesses 34 formed in the side portion for being aligned with the depressions 24 of the base 2. The insert 30 includes a cavity 35 formed in the front portion for receiving a typical audio tape 5 (FIG. 3) therein and includes two studs 351 extended upward from the bottom of the cavity 35 for engaging with the axles of the typical audio tape. The insert 30 also includes two notches 36 formed in the side portions for aligning with the notches 23 of the base 2 such that the audio tape 5 may be easily removed from the insert 30.

A cap 4 includes a rear portion having two bulges 43 formed thereon for engaging with the apertures 26 such that the cap 4 may be rotated relative to the base 2 about the bulges 43. The cap 4 includes one or more openings 41 formed in the side portions and includes one or more protrusions 42 extended inward therefrom corresponding to the location of the openings 41 for engaging with the recesses 34 and the depressions 24 of the insert 30 and the base 2 so as to retain the cap 4 in an enclosed position. The cap 4 further includes a pair of ribs 44 formed in the front portion for engaging with the front wall 32 of the insert 30 so as to further retain the cap 4 to the insert 30.

A paper sheet 90 may be engaged between the base 2 and the insert 30 and another paper sheet 91 may be engaged in the cap 4 and retained in the cap 4 by the protrusions 42. Both the paper sheets 90, 91 may be provided for printing informations of the audio tape 5 thereon.

Figure 5:
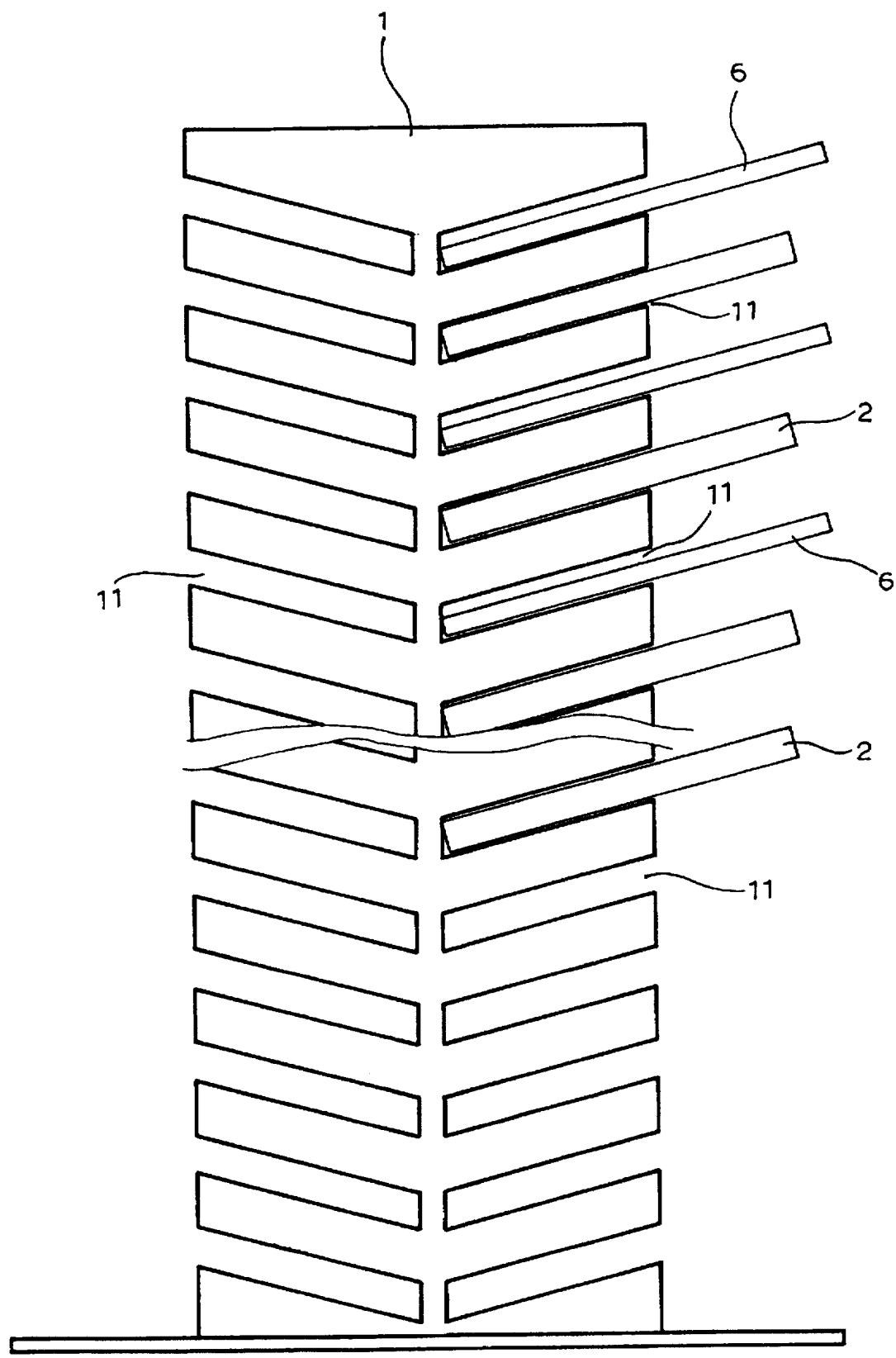
FIG. 5 is a schematic view illustrating the engagement of the cassette in a CD rack.

Referring next to FIG. 5, the cassette 2 includes a length slightly smaller than that of the typical CD casings 6 and includes a thickness slightly larger than that of the CD casings 6. The cassette 2 may also be engaged in the spaces 11 of the CD storing rack 1 which is typically designed for storing CD casings only. Accordingly, the audio tapes having songs or informations similar to that of the CDs may also be stored around the CDs.

Referring next to FIG. 6, the insert 30 may include a tapered bottom portion for supporting the audio tape 5 at a position where the upper surface of the audio tape 5 is substantially horizontal.

Accordingly, the cassette in accordance with the present invention includes an increased size that may be stored in a typical CD storing rack such that the audio tapes having songs or informations similar to that of the CDs may also be stored around the CDs.

It is preferable that the side portions of the cap 4 include a knurled surface for facilitating the opening operation of the cap 4.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A cassette for supporting an audio tape in a compact disc rack, said cassette comprising:

a base including two sides each having a flange laterally extended outward and each having a side wall extended upward, said side walls each including a middle portion having a first notch and each including an upper portion having at least one depression, said side walls each including at least one hole and each including a rear portion having an aperture, said base including a chamber, an insert engaged in said chamber of said base and including two side portions each having at least one projection for engaging with said holes of said base and for securing said insert to said base, said insert including a front wall and including a rear panel and including at least one recess formed in said side portion for aligning with said depressions of said base, said insert including a cavity for receiving an audio tape, said side portions of said insert each including at least one second notch for aligning with said first notches of said base and for allowing the audio tape to be removed from said insert, said insert including a tapered bottom for horizontally supporting the audio tape, and a cap including a rear portion having two bulges for engaging with said apertures and for allowing said cap to be rotated relative to said base about said bulges, said cap including two side portions each having at least one protrusion extended inward for engaging with said recesses and said depressions and for retaining said cap in place, said cap including a front portion having at least one rib for engaging with said front wall of said insert and for securing said cap to said insert.

* * * * *